United States Patent
Englander

(10) Patent No.: US 6,565,219 B1
(45) Date of Patent: May 20, 2003

(54) SINGLE SHELL, DOUBLE VIEW VEHICULAR MIRROR

(75) Inventor: Benjamin Englander, Jamaica, NY (US)

(73) Assignee: Rosco Inc., Jamaica, NY (US)

( * ) Notice: Subject to any disclaimer, the term of this patent is extended or adjusted under 35 U.S.C. 154(b) by 0 days.

(21) Appl. No.: 09/259,123

(22) Filed: Feb. 26, 1999

(51) Int. Cl.$^7$ .......................... G02B 5/08; G02B 7/182; B60R 1/06
(52) U.S. Cl. .................. 359/871; 359/864; 359/865; 248/475.1; 248/476
(58) Field of Search .................. 359/850, 855, 359/864, 865, 868, 871, 872, 877, 881; 248/475.1, 476, 479

(56) References Cited

U.S. PATENT DOCUMENTS

| | | | |
|---|---|---|---|
| 1,386,959 A | | 8/1921 | Severance et al. |
| 2,615,368 A | | 10/1952 | Bindley |
| 2,664,785 A | * | 1/1954 | Roehrig ...................... 359/846 |
| 2,733,637 A | * | 2/1956 | Joseph ........................ 359/847 |
| 3,052,787 A | | 9/1962 | Williams |
| 3,389,952 A | * | 6/1968 | Tobin, Jr. .................... 359/864 |
| 3,391,895 A | | 7/1968 | Bausch et al. |
| 3,563,638 A | * | 2/1971 | Panozzo |
| 3,713,726 A | * | 1/1973 | Magi .......................... 359/871 |
| 3,976,275 A | | 8/1976 | Clark |
| 4,105,295 A | * | 8/1978 | Skilliter, Jr. |
| 4,166,651 A | | 9/1979 | Vandenbrink et al. |
| 4,306,701 A | | 12/1981 | Nierhaus et al. |
| 4,549,791 A | * | 10/1985 | Sharp ......................... 359/872 |
| 4,701,037 A | | 10/1987 | Bramer |
| 4,961,638 A | | 10/1990 | D'Aquaro et al. |
| 5,031,871 A | | 7/1991 | Ohta et al. |
| 5,039,055 A | | 8/1991 | Lempelius |
| 5,044,739 A | | 9/1991 | Santo |
| 5,073,019 A | | 12/1991 | Santo |
| 5,151,824 A | * | 9/1992 | O'Farrell ..................... 359/604 |
| 5,189,561 A | | 2/1993 | Hong |
| 5,311,368 A | * | 5/1994 | Tsuyama ..................... 359/872 |
| 5,513,048 A | | 4/1996 | Chen |
| 5,583,703 A | | 12/1996 | Lang et al. |
| 5,604,645 A | * | 2/1997 | Weaver ....................... 359/877 |
| 5,615,054 A | | 3/1997 | Lang et al. |
| 5,621,577 A | | 4/1997 | Lang et al. |
| 5,687,035 A | * | 11/1997 | Lang .......................... 359/865 |
| 5,721,646 A | * | 2/1998 | Catlin et al. ................. 359/877 |
| 5,724,186 A | * | 3/1998 | Collier |
| 5,760,980 A | | 6/1998 | Lang |
| 5,798,882 A | | 8/1998 | Lang |

FOREIGN PATENT DOCUMENTS

CA 548065 10/1957

* cited by examiner

Primary Examiner—Ricky D. Shafer
(74) Attorney, Agent, or Firm—Ostrolenk, Faber, Gerb & Soffen, LLP

(57) ABSTRACT

A mounting unit for a vehicular side-view mirror includes a substantially planar face plate defined by first and second spaced apart peripheral edges and third and fourth spaced apart peripheral edges, adjacent peripheral edges defining corners; first, second, third, and fourth sides disposed at respective peripheral edges of the face plate, the face plate and sides defining a frame for receiving either a flat or convex mirror; and one or more apertures disposed at one or more of the corners of the face plate, the apertures being sized and shaped such that a convex mirror may be received within the frame and edges thereof may be received at least partially within the apertures.

8 Claims, 8 Drawing Sheets

SINGLE SHELL, DOUBLE VIEW VEHICULAR MIRROR

BACKGROUND OF THE INVENTION

1. Field of the Invention

The present invention generally relates to safety devices for vehicles and, in particular, to a side-view mirror assembly for a vehicle in the form of a single shell, dual view, side-view mirror.

2. Related Art

Side-view mirrors for large vehicles such as school buses, transit buses and trucks present special design challenges. Specifically, because of the height and size of the vehicles, it is necessary to provide an ample viewing area for a long distance along the side of the vehicle, as well as a view which is directed more toward the ground. Conventionally, separate mirror elements have been provided for these diverse viewing requirements. For example, one mirror element has been traditionally mounted to provide a unique field of view by way of a large flat mirror surface and another mirror element has been provided with a convex surface to provide a wider field of view.

These prior art mirror elements, while serving their intended functions, exhibit several problems. First, since the flat mirror surface is traditionally substantially larger than the convex mirror surface, undesirable duplication in inventory, tooling, assembly and associated increases in cost and complexity result. Further, conventional mirror elements are unable to receive a flat mirror and/or a convex mirror during manufacture, field retrofit or repair. This too results in undesirable duplication in inventory, tooling, assembly and associated increases in cost and complexity.

Therefore, there is a need in the art for an improved side-view mirror which employs at least two mirror elements each having a mirror of substantially the same size and/or where each mirror element is capable of receiving either a flat or convex mirror.

SUMMARY OF THE INVENTION

In order to overcome the disadvantages of the prior art, the vehicular side-view mirror assembly of the present invention includes a mounting unit having a substantially planar face plate defined by first and second spaced apart peripheral edges and third and fourth spaced apart peripheral edges, adjacent peripheral edges defining corners; first, second, third, and fourth sides disposed at respective peripheral edges of the face plate, the face plate and sides defining a frame for receiving either a flat or convex mirror; and one or more apertures disposed at one or more of the corners of the face plate, the apertures being sized and shaped such that a convex mirror may be received within the frame and edges thereof may be received at least partially within the apertures.

According to another aspect of the present invention, a vehicular side-view mirror includes a shell housing being engageable with a vehicle; first and second mounting units coupled to the shell housing, each mounting unit including a substantially planar face plate defined by first and second spaced apart peripheral edges and third and fourth spaced apart peripheral edges, each mounting unit further including first, second, third, and fourth sides disposed at respective peripheral edges of the face plate, the face plate and sides defining a frame for receiving a mirror, wherein the respective distances between the respective first and second sides of the mounting units define two heights and the respective distances between the third and fourth sides of the mounting units define two widths, the two heights being substantially the same and the two widths being substantially the same.

The foregoing and numerous other features and advantages of the invention are realized with a mirror assembly which is described below by reference to the drawings and detailed description which follows.

BRIEF DESCRIPTION OF THE DRAWINGS

For the purpose of illustrating the invention, there is shown in the drawing forms which are presently preferred, it being understood, however, that the invention is not limited to the precise arrangements and instrumentalities shown.

FIG. 4b is a side view of the mounting plate of FIG. 4a;

FIG. 5b shows an assembled perspective view of the mirror unit of FIG. 5a;

FIG. 6b shows an assembled perspective view of the mirror unit of FIG. 6a;

FIG. 8b is a side view of the mirror assembly of FIG. 8a; and

FIG. 8c is a rear view of the mirror assembly of FIG. 8a;

DETAILED DESCRIPTION OF EMBODIMENTS OF THE INVENTION

Figure 1:
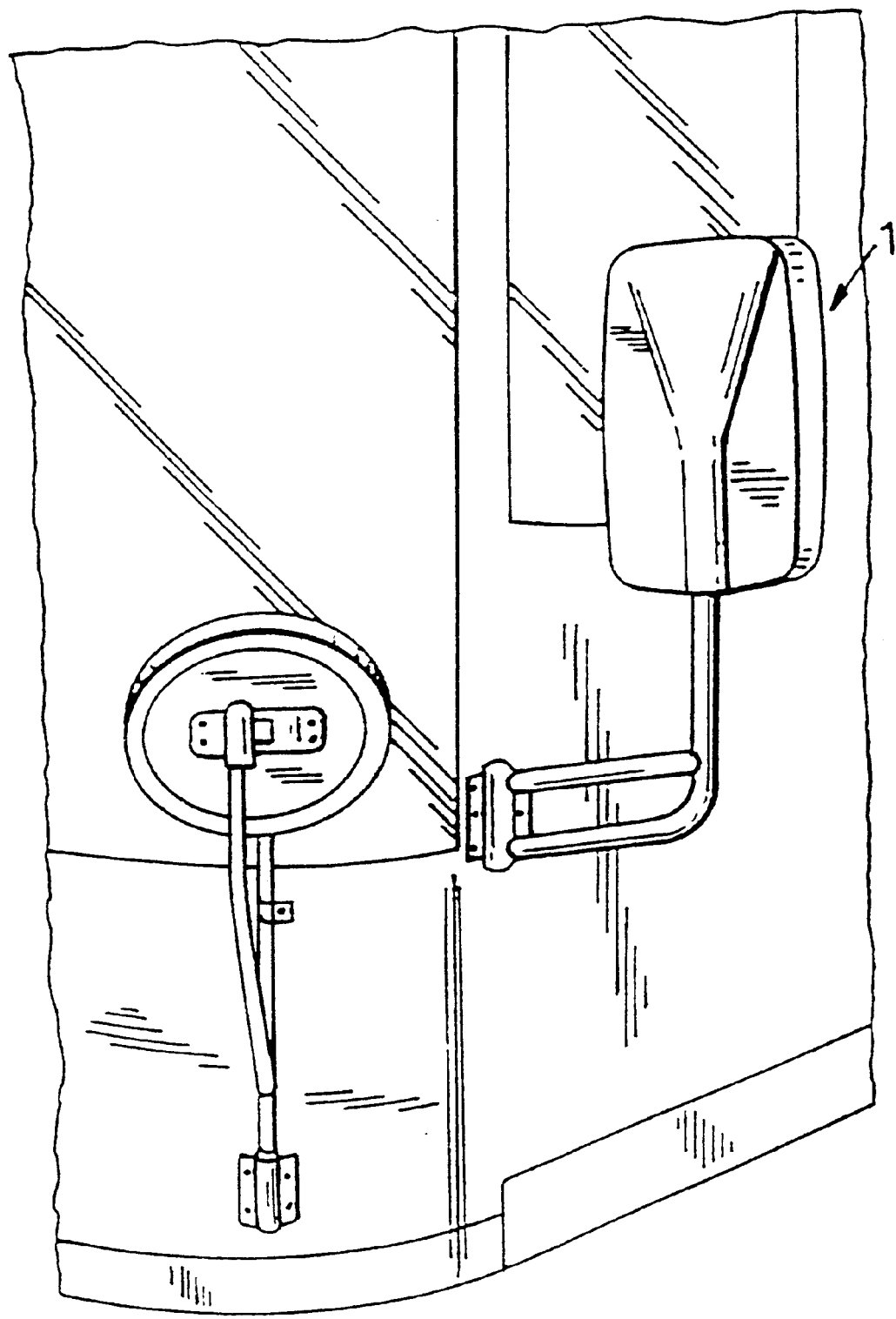
FIG. 1 is a perspective view of the mirror assembly of the present invention mounted to a school bus and providing a side-view thereof.

Referring now to the drawing wherein like numerals indicate like elements, there is shown in FIG. 1 a mirror assembly 1 of the present invention mounted to a school bus. The mirror assembly 1 provides an ample field of view along the side of the vehicle as well as a view which is directed more towards the ground.

Figure 2:
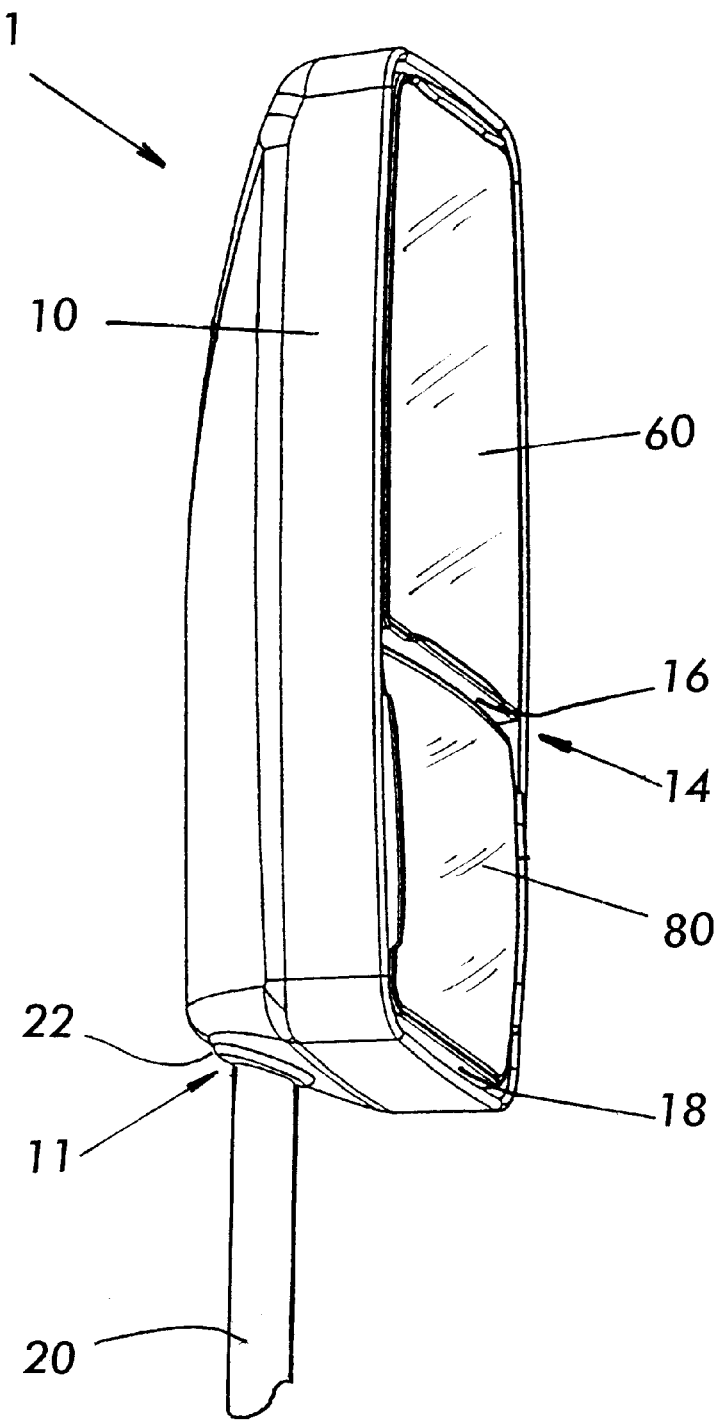
FIG. 2 is a perspective view of the mirror assembly of the present invention which is not mounted to a vehicle.

FIG. 2 shows the mirror assembly 1 not mounted to a vehicle. The mirror assembly 1 comprises a shell housing 10 having a substantially rectangularly shaped opening 14 and interior space for receiving a first mirror unit 16 (shown with a substantially rectangularly shaped flat mirror) and second mirror unit 18 (shown with a substantially rectangularly shaped convex mirror).

The mirror assembly 1 may include a mirror pole for coupling the shell housing 10 and first and second mirror units 16, 18 to the vehicle. A detailed description of these and additional elements employed in coupling the mirror assembly 1 to the vehicle may be found in related U.S. patent application Ser. Nos.: 08/989,800, 08/799,251 and 09/216,124 (filed Dec. 18, 1998, all of which are entitled SINGLE SHELL, DOUBLE VIEW VEHICULAR MIRROR HAVING MANUAL ADJUSTABILITY AND PRECISION HINGE PLATE; and Ser. No. 08/711,810, entitled SINGLE SHELL, DOUBLE VIEW MIRROR FOR VEHICLES, the entire disclosures of which are hereby incorporated by reference.

First and second mirror units 16, 18 are preferably mounted in the shell housing 10 such that the reflecting surfaces of the mirrors 60, 80 lie substantially parallel to the plane of the opening 14. Mounting hole 11 provides an opening for the mirror pole 20 to enter the shell housing 10. A grommet 22 is disposed in the mounting hole 11 and prevents moisture, dirt and the like from entering the shell housing 10 through the mounting hole 11.

The detailed description of the elements employed in securing the mirror units 16, 18 to the shell housing 10 may be found in the foregoing related U.S. Patent Applications.

As best seen in FIG. 2, the shell housing 10 is aerodynamically shaped. Specifically, the forward surface of the shell housing 10 is narrow and tapers outward toward the opening 14, which accepts the mirror units 16, 18. Therefore, wind resistance and vibrations caused by wind velocity are reduced and the tendency for the shell housing 10 to shift or turn as a result of torsional forces developed on the mirror pole 20 from wind are mitigated.

Figure 3:
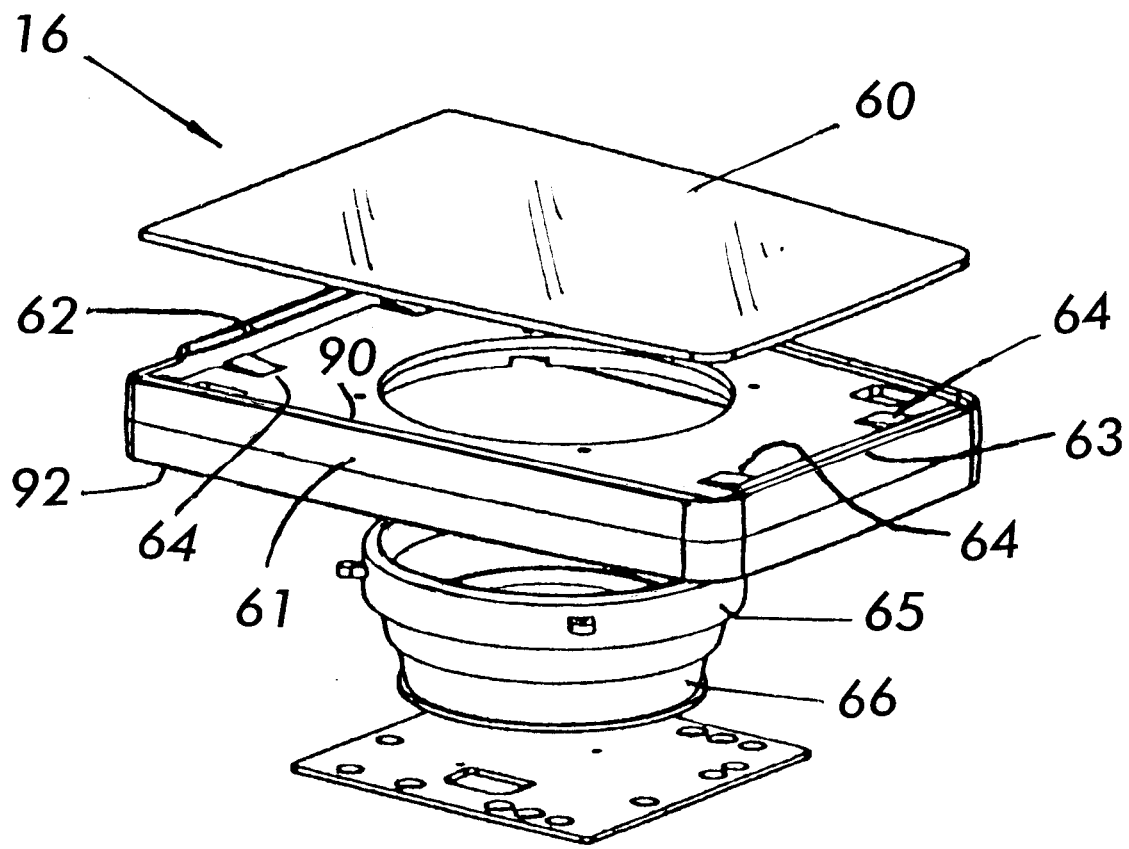
FIG. 3 is an exploded perspective view of a mirror unit of the present invention which includes a flat mirror.

With reference to FIG. 3, the rectangularly shaped first mirror unit 16 is shown in greater detail. The first mirror unit 16 is shown with a flat mirror 60, a mounting plate 61, a cup 65 and a swivel mechanism 66. The swivel mechanism 66 moves in relationship to the cup 65 and couples the mirror unit 16 within the shell housing 10. A detailed description of these and other elements employed in securing the mirror units 16, 18 to the shell housing 10 may also be found in the foregoing related U.S. Patent Applications.

The flat mirror 60 is disposed on the mounting plate 61 and secured at its edges by a relatively long snap 62 and a relatively short snap 63. Relative ease of installation of the flat mirror 60 onto the mounting plate 61 is achieved by first inserting one edge of flat mirror 60 under one of the long snap 62 and the short snap 63 and then pressing the other end of flat mirror 60 under the remaining snap to obtain secure engagement of the flat mirror 60 to the mounting plate 61. It is preferred that one edge of the flat mirror 60 is first placed under the long snap 62 and then the other end of flat mirror 60 is snapped under short snap 63.

The ease with which the flat mirror 60 is secured to, and removed from, the mounting plate 61 enables field replaceability and retrofitability of the flat mirror 60, for example, when the flat mirror 60 is accidentally broken.

Vibration tabs 64 extend somewhat above the plane of the mounting plate 61 and are elastically biased to engage the rear surface of the flat mirror 60 when the mirror is engaged under the long snap 62 and the short snap 63. The force exerted by the vibration tabs 64 to the rear surface of the flat mirror 60 prevents vibrations in the flat mirror 60 when the vehicle is in motion or when vibrations are transmitted to the first mirror unit 16 from other sources such as, for example, from the engine of the vehicle.

Figure 4A:
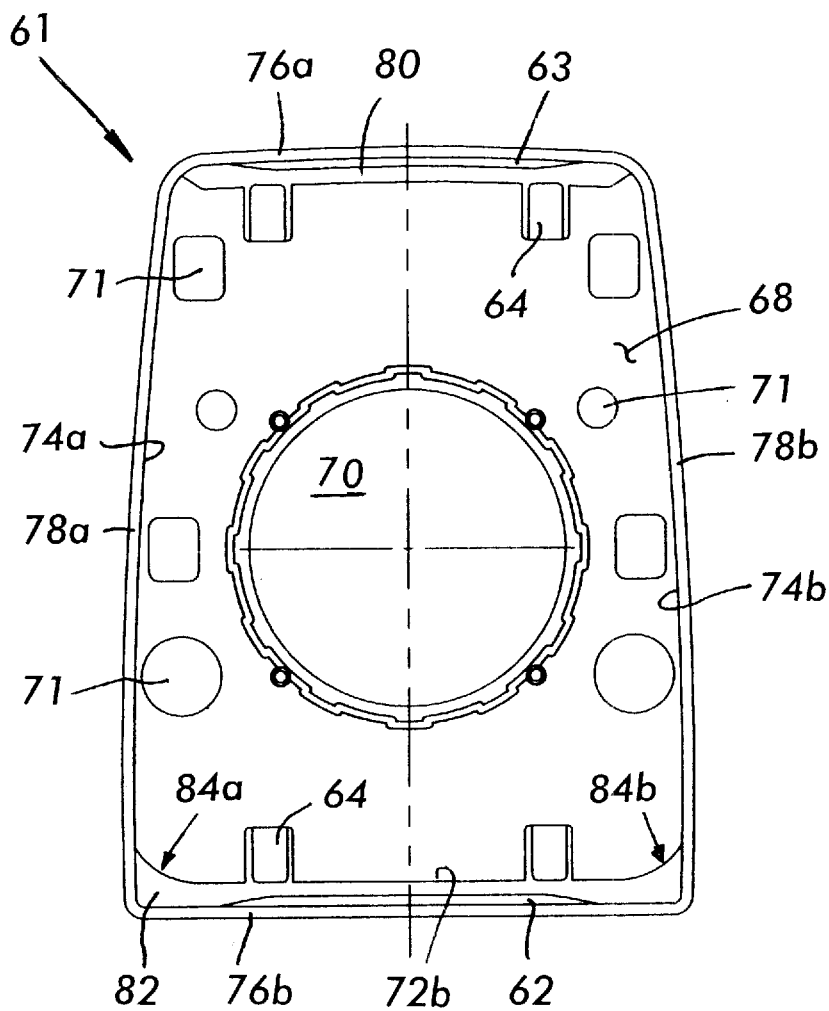
FIG. 4a is a top plan view of a preferred mounting plate of the mirror unit of FIG. 3.

Reference is now made to FIG. 4a where the mounting plate 61 of the present invention is shown in greater detail. The mounting plate 61 includes a face plate 68 having a substantially planar configuration. The face plate 68 includes a substantially centrally located aperture 70 and other apertures 71 for permitting access through the face plate 68. The face plate 68 includes first and second spaced apart peripheral edges 72a and 72b, respectively, and third and fourth spaced apart peripheral edges 74a and 74b, respectively. It is preferred that first, second, third, and fourth peripheral edges 72a, 72b, 74a and 74b define a substantially rectangular structure.

The face plate 68 is framed by sides 76a, 76b, 78a and 78b. Preferably, side 78a abuts third peripheral edge 74a of the face plate 68 and side 78b abuts fourth peripheral edge 74b of the face plate 68. Sides 78a and 78b are preferably disposed substantially transversely with respect to the plane defined by face plate 68. Sides 76a and 76b are coupled to (and are preferably integral with) sides 78a and 78b at corners of the face plate 68. It is most preferred that sides 76a and 76b are also in a traverse relationship with the plane defined by face plate 68 and that the sides 76a and 76b are spaced away from first and second peripheral edges 72a and 72b, respectively. This forms a first relief aperture 80 being disposed between and extending along substantially the entire length of first peripheral edge 72a and side 76a. Similarly, a second relief aperture 82 is disposed between and extends along substantially the entire length of second peripheral edge 72b and side 76b.

Aperture 82 terminates at respective ends of second peripheral edge 72b and side 76b. Preferably, second peripheral edge 72b includes rounded edge 84a which extends from second peripheral edge 72b to third peripheral edge 74a. Second peripheral edge 72b also preferably includes rounded edge 84b extending from second peripheral edge 72b to fourth peripheral edge 74b. The rounded edges 84a and 84b enlarge aperture 82 at the ends of side 76b. Advantageously, the enlargement of the aperture 82 at the corners of face plate 68 permit the substantially flat faceplate 68 to receive a convex shaped mirror (not shown) in the mounting plate 61.

It is noted that additional rounded edges may be employed at other corners of the face plate 68. For example, a rounded edge may be located from first peripheral edge 72a to third peripheral edge 74a, thereby enlarging aperture 80 at one end. Similarly, a rounded edge may be located from first peripheral edge 72a to fourth peripheral edge 74b, thereby enlarging aperture 80 at the other end.

Figure 4B:
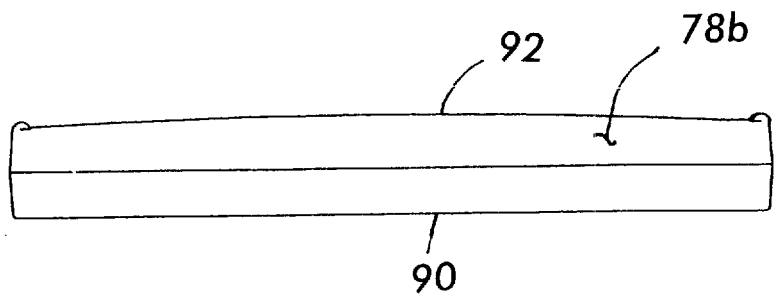
Figure 5A:
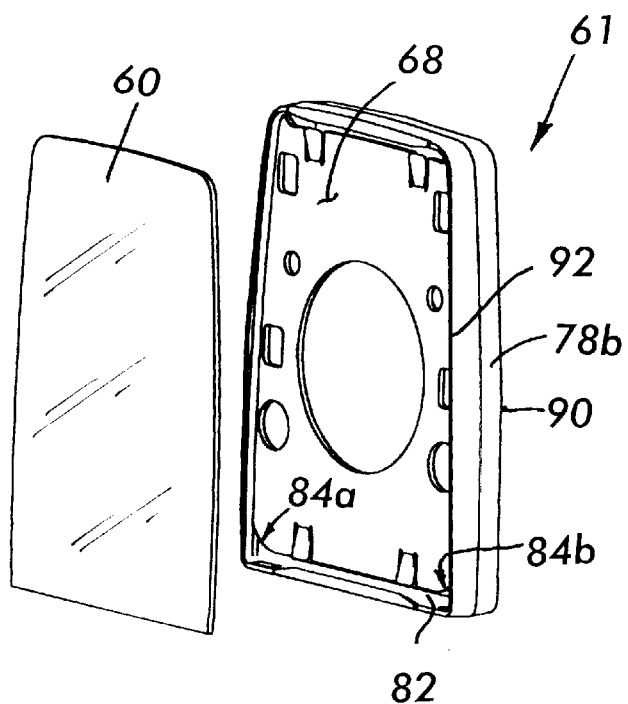
FIG. 5a is an exploded perspective view of a mirror unit employing the mounting plate of FIG. 4a and a flat mirror.
Figure 5B:
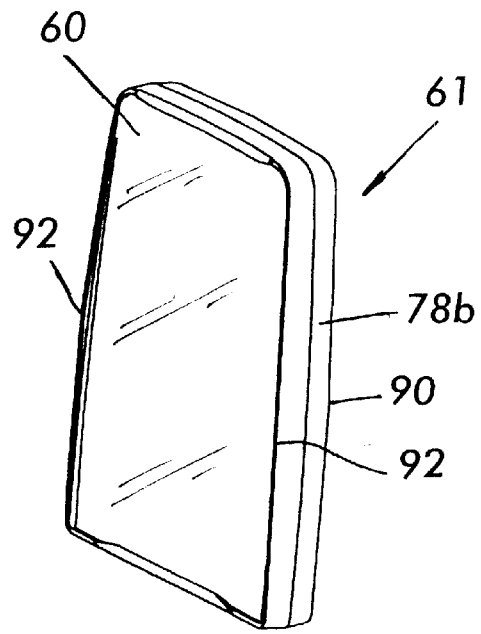
Figure 6A:
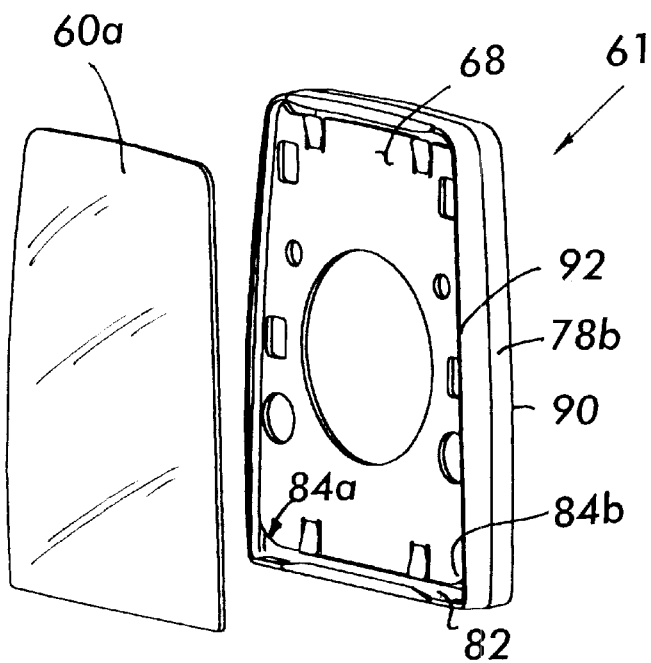
FIG. 6a is an exploded perspective view of a mirror unit employing the mounting plate of FIG. 4a and a convex mirror.
Figure 6B:
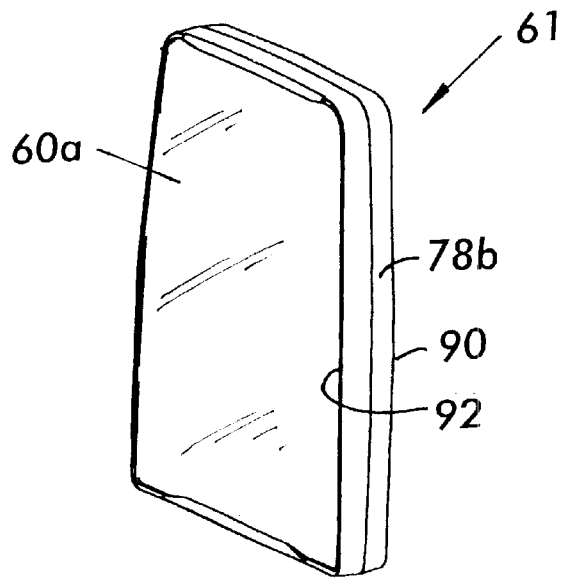

Referring now to FIG. 4b, sides 78a and 78b are defined by spaced apart first and second peripheral edges 90 and 92. Preferably, peripheral edge 90 is substantially straight while peripheral edge 92 includes a radius of curvature which substantially matches the radius of curvature of a convex mirror (not shown) which may be received in the mounting plate 61. It is noted that sides 78a and 78b are substantially mirror images of each other. Thus, the convex mirror may be received within mounting plate 61 without extending out of the frame defined by sides 76a, 76b, 78a and 78b.

Referring to FIGS. 5a–5b and 6a–6b, the mounting plate 61 of the present invention can advantageously receive a flat mirror 60 or a convex mirror 60a because the enlarged aperture 82 formed by rounded edges 84a and 84b of the face plate 68 provides relief for the rounded and curving surface of the convex mirror 60a. Further, the curving peripheral edges 92 of sides 78a and 78b substantially follow the curvature of the convex mirror 60a, thereby providing the requisite protection of the edges of the mirror 60a. When the flat mirror 60 is received within the mounting plate 61, curved peripheral edge 92 extends somewhat above the plane defined by mirror 60 and, therefore, also provides the requisite protection of the edges of the mirror 60.

Advantageously, the mounting plate 61 is capable of removably receiving either a flat mirror 60 or a convex mirror 60a, thereby reducing costs and complexities associated with manufacturing and maintaining the mounting plate 61 for commercial service.

Figure 7:
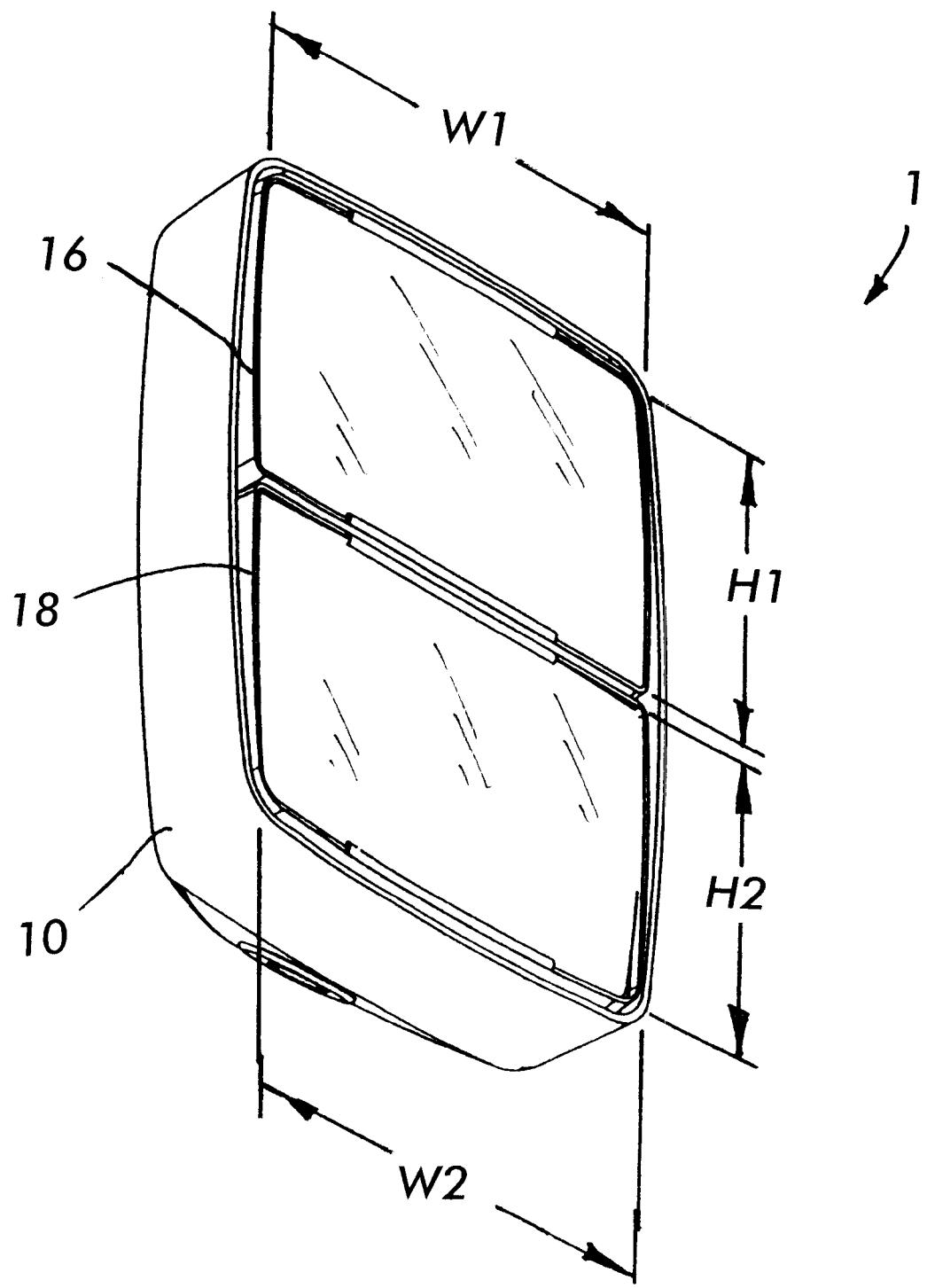
FIG. 7 is a perspective view of a mirror assembly in accordance with another aspect of the present invention.
Figure 8A:
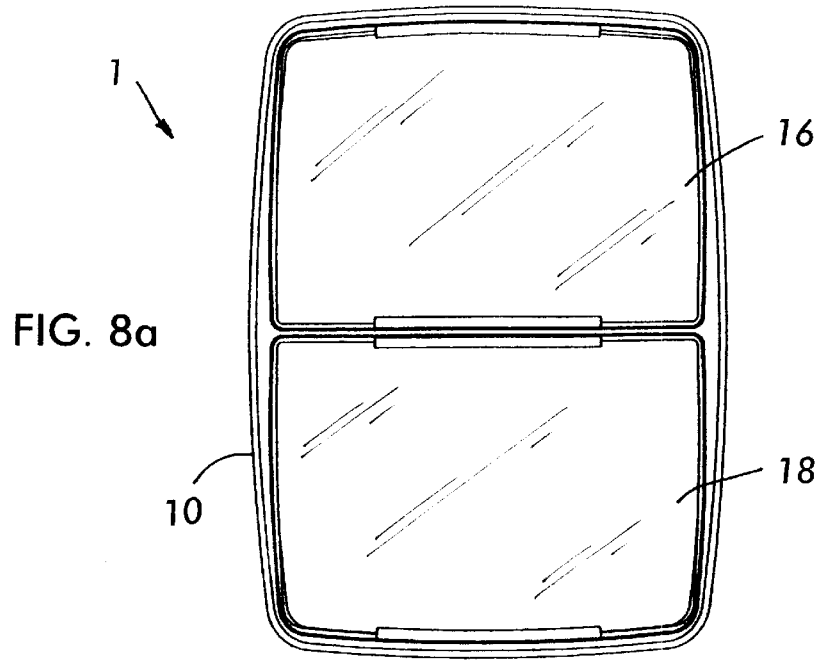
FIG. 8a is a front plan view of the mirror assembly of FIG. 7.
Figure 8B:
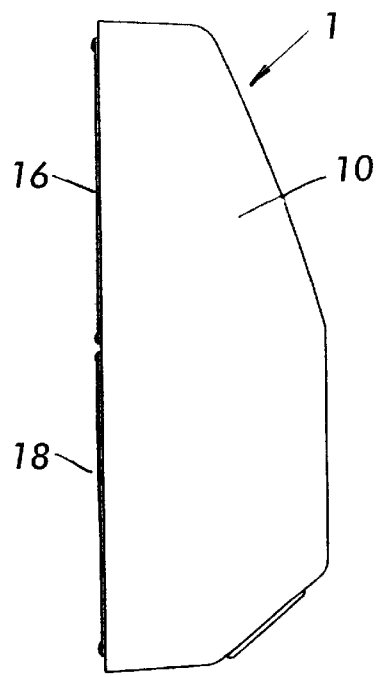
Figure 8C:
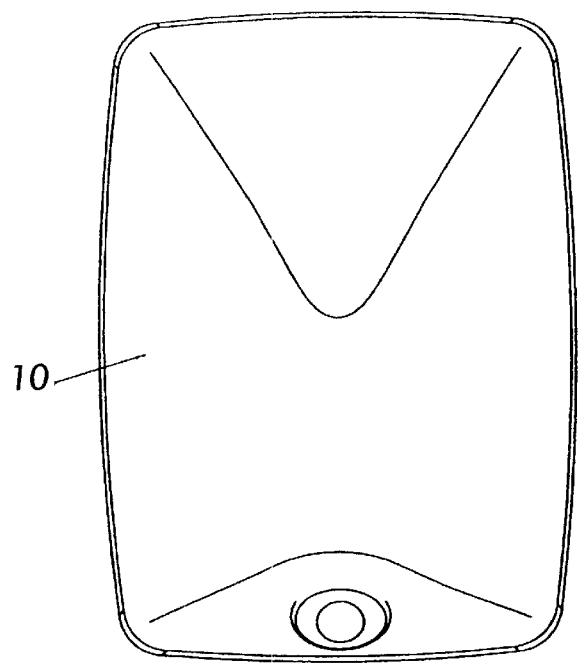

Reference is now made to FIG. 7 which illustrates another embodiment of the present invention. Mirror assembly 1 includes a first mirror unit 16 and a second mirror unit 18 which are of substantially the same peripheral dimensions. More particularly, mirror unit 16 includes a height H1 and a width W1 and mirror unit 18 has a height H2 and a width W2. Preferably, height H1 is substantially the same as height H2 and with W1 is substantially the same as width W2. It is understood that H1 and H2 need not be precisely the same but it is most preferred that they are within about 2% of one another. Similarly, W1 need not be precisely the same W2, it being understood that W1 and W2 may be within about 2% of one another. FIGS. 8a, 8b and 8c show front, side and rear views, respectively, of the mirror assembly 1 of FIG. 7.

Preferably, one of mirror units 16 and 18 includes a flat mirror 60 while the other mirror unit includes a convex mirror 60a. Most preferably, mirror units 16 and 18 include the mounting plate 61 described hereinabove which receives either a flat or convex mirror.

Advantageously, the mirror assembly 1 of the present invention enjoys the advantages of utilizing standardized components, namely, a mounting plate 61 which is capable of receiving either a flat or convex mirror and also utilizes at least a pair of mounting plates 61 having substantially the same peripheral dimensions.

The shell housing 10 and the mounting plate 61 may be manufactured from suitable plastics, metals, composite materials or the like, suitable plastics being preferred.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed:

1. A mounting unit for a vehicular side-view mirror, comprising:

a substantially planar face plate defined by first and second spaced apart peripheral edges and third and fourth spaced apart peripheral edges, adjacent peripheral edges defining corners;

first, second, third, and fourth sides disposed at respective peripheral edges of the face plate, the face plate and sides defining a frame for receiving a mirror;

apertures disposed at the corners of the face plate, the apertures being sized and shaped such that the mirror may be received within the frame and edges of the mirror may be received at least partially within the apertures;

a shell housing being engageable with a vehicle; and the mounting unit coupled to the shell housing;

wherein one or more of the first, second, third, and fourth sides are in engagement with the respective peripheral edges of the face plate, the remaining one or more sides being spaced away from the respective peripheral edges of the face plate to at least partially define the apertures; and wherein one or more of the peripheral edges of the face plate which are spaced away from the respective sides are spaced further from the respective sides near the corners than at other positions such that the apertures are larger near the corners.

2. The mounting unit of claim 1, wherein the first and second spaced apart sides are spaced away from the first and second peripheral edges, respectively, of the face plate to at least partially define the apertures, the third and fourth spaced apart sides being engaged with the third and fourth peripheral edges of the face plate, respectively.

3. The mounting unit of claim 2, wherein the first side and first peripheral edge define a first one of the apertures and the second side and second peripheral edge define a second one of the apertures, the second peripheral edge of the face plate being further from the second side near the corners than at other positions such that the second aperture is larger near the corners.

4. The mounting unit of claim 3, wherein the second peripheral edge of the face plate is sized and shaped such that a convex mirror may be received within the frame and edges of the mirror may be received at least partially within the apertures.

5. The mounting unit of claim 3, wherein the second peripheral edge of the face plate includes rounded portions near the corners such that the second aperture is larger near the corners.

6. The mounting unit of claim 3, wherein the face plate defines a plane and the first, second, third, and fourth sides are disposed substantially transversely with respect to the plane.

7. The mounting unit of claim 1, in which the mirror is a convex mirror.

8. The mounting unit of claim 1, in which the mirror is a flat mirror.

* * * * *